United States Patent
Rowson et al.

(10) Patent No.: US 11,438,036 B2
(45) Date of Patent: Sep. 6, 2022

(54) CLIENT GROUPING FOR POINT TO MULTIPOINT COMMUNICATIONS

(71) Applicant: AVX Antenna, Inc., San Diego, CA (US)

(72) Inventors: Sebastian Rowson, San Diego, CA (US); Norik Dzhandzhapanyan, San Diego, CA (US); Jeffrey L. Hilbert, Las Vegas, NV (US)

(73) Assignee: KYOCERA AVX COMPONENTS (SAN DIEGO), INC., San Diego, CA (US)

( * ) Notice: Subject to any disclaimer, the term of this patent is extended or adjusted under 35 U.S.C. 154(b) by 0 days.

(21) Appl. No.: 17/084,166

(22) Filed: Oct. 29, 2020

(65) Prior Publication Data

US 2021/0152222 A1    May 20, 2021

Related U.S. Application Data

(60) Provisional application No. 62/935,275, filed on Nov. 14, 2019.

(51) Int. Cl.
*H04B 7/0452* (2017.01)
*H04L 67/104* (2022.01)
(Continued)

(52) U.S. Cl.
CPC ......... *H04B 7/0452* (2013.01); *H04L 12/189* (2013.01); *H04L 67/1051* (2013.01);
(Continued)

(58) Field of Classification Search
CPC . H04B 7/0452; H04L 12/189; H04L 67/1051; H04L 67/322; H04W 4/06; H04W 72/005
See application file for complete search history.

(56) References Cited

U.S. PATENT DOCUMENTS 6,765,536 B2  7/2004  Phillips et al.
6,987,493 B2  1/2006  Chen
(Continued)

FOREIGN PATENT DOCUMENTS

WO    WO 2017-206100    12/2017

OTHER PUBLICATIONS

PCT International Search Report and Written Opinion for corresponding PCT Application No. PCT/US2019/056667, dated Feb. 4, 2020, 10 pages.
(Continued)

*Primary Examiner* — Janice N Tieu
(74) *Attorney, Agent, or Firm* — Dority & Manning, P.A.

(57) ABSTRACT

A communication system for point to multipoint communications by grouping client devices based on associated modes is provided. In one example implementation, point to multipoint communication improvements are achieved by grouping a plurality of client devices by their optimal modes for communication. For example, the communication system can determine, based on channel quality indicators (CQIs) that two client devices of a plurality of client devices are associated with an optimal first mode of a modal antenna. The system can group the two client devices into a first group, the first group associated with communication using the first mode of the modal antenna. The modal antenna can communicate with the first group using the first mode of a modal antenna during a single frame of communication.

13 Claims, 11 Drawing Sheets

(51) Int. Cl.
  *H04W 4/06* (2009.01)
  *H04L 12/18* (2006.01)
  *H04L 67/61* (2022.01)
  *H04W 72/00* (2009.01)
(52) U.S. Cl.
  CPC ............... *H04L 67/61* (2022.05); *H04W 4/06* (2013.01); *H04W 72/005* (2013.01)

(56) References Cited

U.S. PATENT DOCUMENTS

| | | | |
|---|---|---|---|
| 7,068,234 | B2 | 6/2006 | Sievenpiper |
| 7,215,289 | B2 | 5/2007 | Harano |
| 7,830,320 | B2 | 11/2010 | Shamblin |
| 7,911,402 | B2 | 3/2011 | Rowson et al. |
| 8,362,962 | B2 | 1/2013 | Rowson et al. |
| 8,446,318 | B2 | 5/2013 | Ali et al. |
| 8,648,755 | B2 | 2/2014 | Rowson et al. |
| 8,717,241 | B2 | 5/2014 | Shamblin et al. |
| 9,065,496 | B2 | 6/2015 | Rowson et al. |
| 9,231,669 | B2 | 1/2016 | Desclos et al. |
| 9,240,634 | B2 | 1/2016 | Rowson et al. |
| 9,425,497 | B2 | 8/2016 | Pajona et al. |
| 9,439,151 | B2 | 9/2016 | Zhu et al. |
| 9,479,242 | B2 | 10/2016 | Desclos et al. |
| 9,590,703 | B2 | 3/2017 | Desclos et al. |
| 9,748,637 | B2 | 8/2017 | Rowson et al. |
| 9,755,305 | B2 | 9/2017 | Deslos et al. |
| 9,755,580 | B2 | 9/2017 | Desclos et al. |
| 10,439,272 | B1 | 10/2019 | Rowson et al. |
| 2010/0277368 | A1 | 11/2010 | Ponnuswamy |
| 2011/0002219 | A1 | 1/2011 | Kim et al. |
| 2013/0072247 | A1 | 3/2013 | Park et al. |
| 2013/0120200 | A1 | 5/2013 | Declos et al. |
| 2014/0055302 | A1 | 2/2014 | Jia |
| 2016/0095130 | A1 | 3/2016 | Ho |
| 2016/0112147 | A1 | 4/2016 | Seo et al. |
| 2016/0365900 | A1* | 12/2016 | Kim .................. H04B 7/088 |
| 2016/0373171 | A1 | 12/2016 | Patwardhan et al. |
| 2018/0342803 | A1* | 11/2018 | Desclos ............... H04L 63/107 |
| 2020/0169370 | A1* | 5/2020 | Cheng .................. H04L 5/0037 |

OTHER PUBLICATIONS

International Search Report and Written Opinion for PCT/US2020/057965, dated Feb. 16, 2021, 15 pages.

* cited by examiner

CLIENT GROUPING FOR POINT TO MULTIPOINT COMMUNICATIONS

PRIORITY CLAIM

The present application claims the benefit of priority of U.S. Provisional App. No. 62/935,275, titled "Client Grouping for Point to Multipoint Communications," having a filing date of Nov. 14, 2019, which is incorporated by reference herein.

FIELD

The present disclosure relates generally to antenna systems, and more particularly to systems and methods for client grouping for point to multipoint communications.

BACKGROUND

Wireless communications systems can often include a base station or access point configured to communicate with multiple devices, such as one or more smartphones, laptops, desktops, printers, smart TVs, tablets, internet-of-things devices, and other devices over a wireless communication medium. For instance, multiple devices can communicate over a wireless local area network (WLAN) via an access point (e.g., a wireless router). A WiFi network can include a WLAN where devices communicate with an access point using IEEE 802.11 standards. Access points for WLAN can include one or more antennas for wirelessly communicating with multiple client devices.

SUMMARY

Aspects and advantages of embodiments of the present disclosure will be set forth in part in the following description, or may be learned from the description, or may be learned through practice of the embodiments.

One example aspect of the present disclosure is directed to a communication system for point to multipoint communications. The communication system includes one or more modal antennas. Each modal antenna is configured to operate in a plurality of modes. Each mode of the plurality of modes is associated with a distinct radiation pattern. The system can include a transceiver configured to communicate with a plurality of client devices over a wireless communication medium via the one or more modal antennas over a plurality of frames. The system can include one or more control devices configured to control the one or more modal antennas by performing operations. The operations can include associating one or more modes of the plurality of modes with each client device of the plurality of client devices. The operations can include sorting each client device of the plurality of client devices into one or more groups of a plurality of groups based at least in part on the one or more modes associated with the plurality of client devices. The operations can include, for each frame in a plurality of frames, determining a selected group of the plurality of groups for communication, determining a selected mode of the plurality of modes for communication with the selected group, configuring the one or more modal antennas in the selected mode, and communicating with one or more client devices in the selected mode during the frame.

Another example aspect of the present disclosure is directed to a method for communicating in a point to multipoint communication system. The method includes associating one or more modes of a plurality of modes of one or more modal antennas with each client device of a plurality of client devices. Each of the plurality of modal antennas is operable to be configured in the plurality of modes. Each of the plurality of modes can have a distinct radiation pattern. The method includes sorting each client device of the plurality of client devices into one or more groups of a plurality of groups based, at least in part, on the one or more modes associated with the plurality of client devices. The method includes communicating data over a plurality of frames in a time division multiplexed manner to the plurality of client devices using the one or more modal antenna. Furthermore, for each of the plurality of frames, the method includes determining a selected group of the plurality of groups for communication. The method includes determining a selected mode of the plurality of modes for the modal antenna to communicate during the frame based, at least in part, on the plurality of groups. The method includes configuring the one or more modal antennas to operate in the selected mode during the frame.

Yet another example aspect of the present disclosure is directed to a wireless network access point. The wireless network access point includes one or more modal antennas. The one or more modal antennas are operable in a plurality of different modes. Each of the plurality of modes can be associated with a distinct radiation pattern. The wireless network access point includes a transceiver configured to communicate with a plurality of groups of client devices over a wireless a wireless communication medium via the modal antenna over a plurality of frames. The wireless network access point includes one or more control devices configured to control the operation of the one or more modal antennas by selecting a mode of operating the modal antenna on a per frame, per group, per antenna basis.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
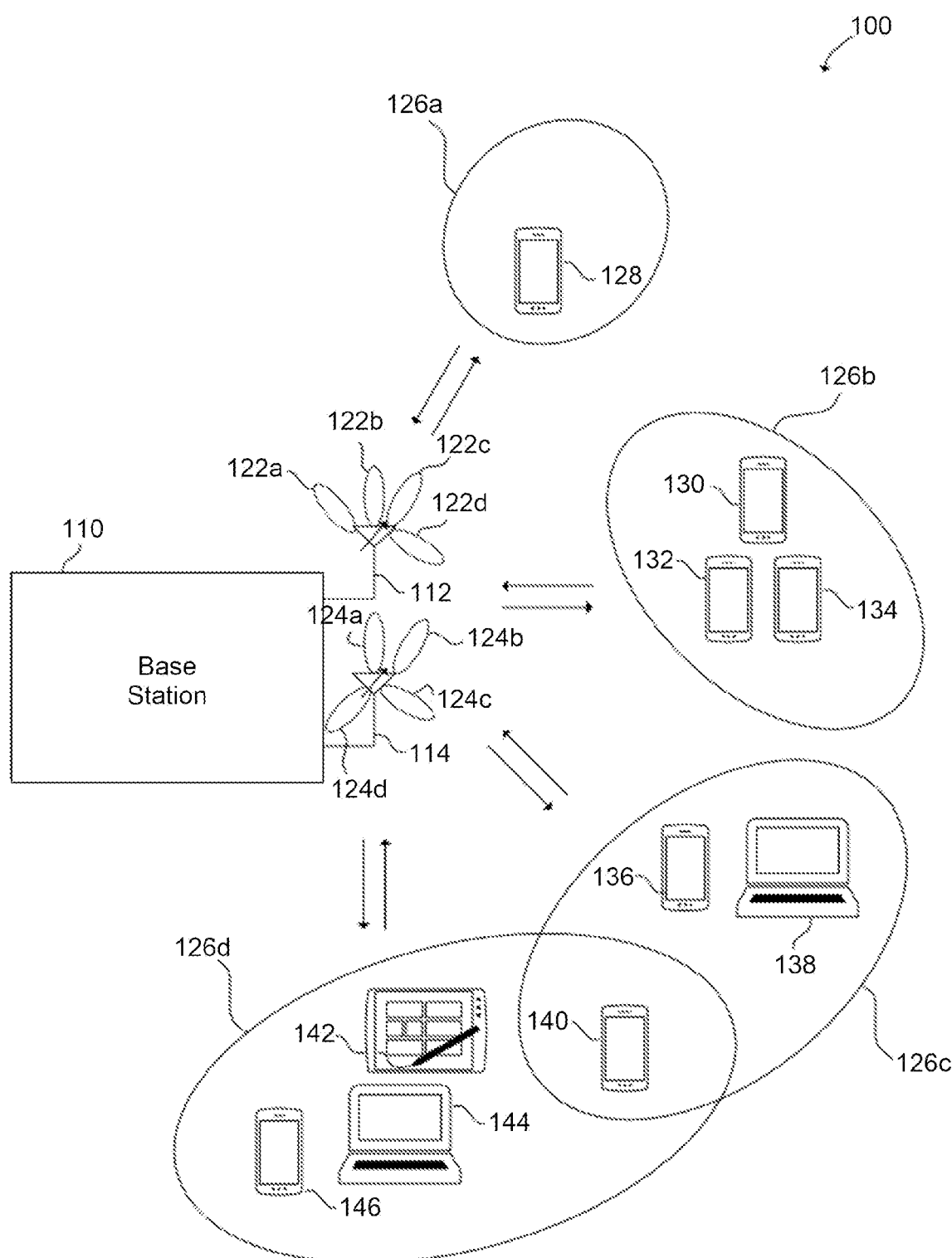
FIG. 1 depicts an example communication system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to grouping of client devices in a communication system for improved point to multipoint communications, such as in a wireless local area network (WLAN) (e.g., a WiFi network) or other point to multipoint networks. A point to multipoint communication system can include a base station or terminal configured to communicate over a wireless communication medium with a plurality of different client devices. For instance, the base station can be a wireless router serving as a WLAN access point for a plurality of electronic devices, such as one or more smartphones, tablets, desktops, laptops, printers, internet of things devices, smart TVs, and other electronic devices.

The base station can be configured to communicate over a wireless communication medium with the client devices using one or more modal antennas. The modal antenna(s) can be configured in a plurality of different modes. Each mode can be associated with distinct radiation pattern characteristics (e.g., distinct polarization and/or distinct radiation pattern). In some embodiments, the modal antennas can include one or more parasitic elements that are distinct from a radiating element. The one or more parasitic elements can be positioned proximate to the radiating element. One or more active elements (e.g., switches, etc.) can be controlled to adjust electrical characteristics of the one or more parasitic elements positioned proximate to a radiating element to configure the modal antenna in one of a plurality of different modes. Example modal antennas will be discussed in more detail with reference to FIGS. 11-13. In this way, the modal antenna(s) can be controlled, for instance, to point radiation lobes in a direction of intended RF communication gain and/or to point nulls to desired locations (e.g., to mitigate interference). As used herein, a modal antenna refers to any antenna(s) that can be configurable in a plurality of different modes with each mode associated with distinct radiation pattern characteristics.

In some example embodiments, the plurality of client devices can be sorted into one or more groups of a plurality of client device groups. The client devices can be sorted into groups based at least in part on the one or more modes associated with each client device of the plurality of client devices such that each client device in a group is associated with the same antenna mode. A group of client devices can include one or more client devices. A client device can be a member of one or more groups. For example, client device A and client device B may both be associated with mode 1 of a modal antenna, while client device C may be associated with mode 2 of a modal antenna. Client devices A and B can be grouped together in a group 1 while client device C can be grouped in a group 2. For another example, client device A may be associated with mode 1 of a modal antenna, client device B may be associated with modes 1 and 2 of a modal antenna, and client device C may be associated with mode 2 of a modal antenna. Client device A can be grouped with client device B in a group 2 while client device C can be grouped with client device B in a group 2, giving client device B membership in two groups.

In some embodiments, sorting the plurality of client devices into one or more groups can include communicating data indicative of group membership in the one or more groups to each client device of the plurality of client devices. Each client device can communicate with the communication system to receive data indicating their membership in one or more groups. The data can further indicate the one or more modes associated with the one or more groups.

In some example embodiments, a group can be associated with one or more modes based at least in part on the one or more client devices that are members of that group. For example, a group 1 including client devices A and B may be associated with mode 1 of a modal antenna while a group 2 including client device C may be associated with modes 2, 3, and 4 of a modal antenna. For another example, a group 1 including client devices A and B may be associated with modes 1 and 2 of a modal antenna while a group 2 including client device C may be associated with modes 2 and 3 of a modal antenna.

In some example embodiments, the base station can be configured to communicate with the one or more groups of client devices using a time division multiplexing scheme. The time division multiplexing scheme can allocate transmit and receive frames for different groups of clients to different time slots on the same frequency band or multiple frequency bands. According to example aspects of the present disclosure, the one or more modal antennas can be operated to enhance signal quality in wireless communication between the base station and a plurality of different groups of client devices by configuring the modal antennas on a per frame, per group basis (e.g., per frame, per group, per antenna basis) to provide enhanced signal quality with each group of client devices. The base station can be configured to communicate using other multiplexing schemes or communication schemes without deviating from the scope of the present disclosure.

In some implementations, for each frame, one or more control devices configured to control operation of the modal antennas can identify the group of client devices with which the base station is communicating for the frame. Based on the group of client devices, the one or more control devices can select a mode of the plurality of modes for operation of the modal antenna(s). The mode can be selected, for instance, based on a channel quality indicator (CQI) associated with communication to each client device of the group of client devices in the mode. Channel quality indicators (CQI's) can be used to determine one or more best modes to communicate with each client device of the plurality of client devices. The mode can be selected to increase channel quality and/or to optimize channel quality with the group of client devices for the frame.

As used herein, a frame represents a division of time in a communication scheme. A base station can communicate over a wireless communication medium with one or more groups of client devices during a frame. For instance, a base station can receive from group(s) of client devices in a receive frame. A base station can transmit to group(s) of client devices in a transmit frame.

Example CQIs that can be used in antenna mode selection can include, for instance, signal-to-noise ratio (SNR), signal to interference-plus-noise ratio (SINR), receive signal strength indicator (RSSI), bit error rate (BER), a magnitude error ratio (MER), an error vector magnitude (EVM), a block error rate (BLER), a packet error rate (PER) combinations of the foregoing, and/or various other metrics. The CQIs can be used to characterize uplink signal quality between the base station and the group of client devices and/or to characterize downlink signal quality between the base station and the group of client devices.

In one example implementation, the selected mode of the modal antenna(s) for a frame can be determined using group index data. Group index data can include data that associates each client device of the plurality of client devices with one or more groups based at least in part on channel quality indicators (CQI's) indicating the one or more best modes for communicating with each client device. The group index data can further associate one or more modes with each group based on the one or more best modes associated with each member of each group. For instance, the group index data can correlate one or more best modes (e.g., modes with the highest and/or next highest CQI metric) of a modal antenna(s) with a particular group of client devices. The group index data can be stored and/or implemented in one or more memory devices. The group index data can be implemented as a lookup table, matrix, data structure, function, algorithm or other implementation that correlates one or more particular modes of a modal antenna to a group of client devices.

In some embodiments, the group index data can be generated by operating the communication system in a training mode. During the training mode, the system controls the modal antenna(s) to operate in each of the plurality of different modes. While operating in each mode, the system obtains CQI(s) for communicating with each client device. The CQI(s) can be analyzed to determine which one or more modes (e.g., one or more best or near optimum modes) are desired for communicating with a particular client device to improve signal quality. These one or more modes can be associated with each client device. The system can sort the client devices into one or more groups based at least in part on the one or more modes associated with each client device. For example, client devices A, B, and C may be sorted into group 1 based at least in part on the client devices A, B, and C each being associated with modes 1 and 2 of a modal antenna.

In some embodiments, the system can associate one or more modes with each group of the plurality of groups based at least in part on the one or more modes associated with each client device that is a member of a group. For example, a group can contain client devices A, B, and C, each of the three devices associated with modes 1 and 2 of a modal antenna. The group can be associated with modes 1 and 2 based at least in part on each member of the group being associated with modes 1 and 2.

The training mode can be implemented upon the occurrence of various different trigger conditions. For instance, the trigger condition can be associated with startup or set up of the communication system. As another example, a trigger condition can be the passage of a period of time. In this way, the system can implement the training mode at regular and/or irregular time intervals.

In some embodiments, the trigger condition can be based on a CQI change or based on a use condition. For instance, the system can implement the training mode when a CQI associated with communicating to a particular group of client devices changes by a threshold amount. As another example, the system can implement the training mode when a location associated with a group has moved by a threshold amount (e.g., as determined from, for instance, signal strength, data from a positioning system, etc.). In some embodiments, the training mode can be implemented when a new client device joins a group and/or a new group of client devices joins the communication system.

In one particular example, the training mode can be implemented as an interframe training mode that occurs across a plurality of frames for communicating between the base station and a client device. During the interframe training mode, frames are used to obtain CQIs while operating the modal antennas in each of the plurality of modes. The CQIs can be analyzed to determine which mode provides an optimum or improved CQI for communicating with a particular group of client devices. The determined mode can be associated with the group of client devices in the group index data. The training mode can be implemented using the receive frames to maintain increased signal quality during transmit frames.

In another particular example, the training mode can be implemented as an intraframe training mode. During the intraframe training mode, CQIs can be obtained for multiple modes within a single receive frame.

The communications systems and methods according to example aspects of the present disclosure can provide a number of technical effects and benefits. For instance, grouping a plurality of client devices into one or more groups of client devices can increase the number of client devices that can be communicated with simultaneously and more efficiently using the same mode of the modal antenna(s) (e.g., to provide increased channel quality) without having to switch between antenna modes.

FIG. 1 depicts an example client grouping and communication system 100 according to example embodiments of the present disclosure. The communication system 100 includes a base station 110. In some embodiments, the base station 110 can be an access point for a wireless local area network (WLAN), such as a WiFi network. Aspects of the present disclosure are discussed with reference to a WLAN such as a WiFi network for purposes of illustration and discussion. Those of ordinary skill in the art, using the disclosures provided herein, will understand that the point to multipoint communication system can be implemented in other infrastructures/communication systems (e.g., cellular, etc.) without deviating from the scope of the present disclosure.

The base station 110 is in wireless communication with a plurality of client devices 128, 130, 132, 134, 136, 138, 140, 142, 144, and 146. The plurality of client devices can include, for instance, one or more smartphones, tablets, laptops, desktops, wearable devices, printers, internet of things devices, appliances, or other electronic devices. Each client device can be a member of one or more groups of client devices 126*a*, 126*b*, 126*c*, and 126*d*. For example, client device 128 is a member of group 126*a*. For another example, client devices 130, 132, and 134 are members of group 126*b*. Client devices can be members of a plurality of groups. For example, client device 140 is member of group 126*c* and 126*d*. The base station 110 can communicate over a wireless communication medium with the plurality of groups of client devices 126*a*, 126*b*, 126*c*, and 126*d* using a wireless communication protocol. One example protocol can include any of the IEEE 802.11 protocols associated with WiFi networks.

Ten client devices 128, 130, 132, 134, 136, 138, 140, 142, 144, and 146 are illustrated in FIG. 1 for example purposes. Any number of client devices can be included in the communication system without deviating from the scope of the present disclosure.

Four groups of client devices 126*a*, 126*b*, 126*c*, 126*d* are illustrated in FIG. 1 for example purposes. Any number of groups of client devices can be included in the communication system without deviating from the scope of the present disclosure.

The base station 110 can include one or more modal antennas for communicating with the groups 126*a*, 126*b*, 126*c*, and 126*d*. In the example of FIG. 1, the base station 110 includes a first modal antenna 112 and a second modal antenna 114. The base station can include more or fewer antennas without deviating from the scope of the present disclosure.

The modal antennas 112 and 114 can be configured to be operated in a plurality of different modes. Each mode can be associated with a different radiation pattern. For instance, first modal antenna 112 can be operated in a first mode to provide radiation pattern 122*a*. The first modal antenna 112 can be operated in a second mode to provide radiation pattern 122*b*. The first modal antenna 112 can be operated in a third mode to provide radiation pattern 122*c*. The first modal antenna 112 can be operated a fourth mode to provide radiation pattern 122*d*.

Similarly, the second modal antenna 114 can be operated in a first mode to provide radiation pattern 124*a*. The second modal antenna 114 can be operated in a second mode to provide radiation pattern 124*b*. The second modal antenna 114 can be operated in a third mode to provide radiation pattern 124*c*. The second modal antenna 114 can be operated a fourth mode to provide radiation pattern 124*d*.

Aspects of the present disclosure are discussed with reference to modal antennas configured to be operated in four modes for purposes of illustration and discussion. Those of ordinary skill in the art, using the disclosures provided herein, will understand that any of the modal antennas discussed herein can be operated in more or fewer modes without deviating from the scope of the present disclosure.

In some embodiments, the first modal antenna 112 and/or the second modal antenna 114 can include an active radiating element and one or more parasitic elements. Active radiating elements can be positioned proximately to the one or more parasitic elements. Active radiating elements can be configured to selectively couple the proximately positioned parasitic elements to ground or otherwise adjust electrical characteristics associated with the parasitic elements to adjust the radiation pattern provided by the active radiating element to operate the modal antenna in one of the plurality of different modes. Example modal antennas will be discussed in more detail with reference to FIGS. 11-13.

As one example, the base station 110 can be configured to communicate with one or more of the groups 126*a*, 126*b*, 126*c*, and 126*d* in a time division multiplexed manner. The time division multiplexing scheme can allocate transmit and receive frames for different groups to different time slots on the same frequency band. Example frequency bands for can include, for instance, frequency bands associated with IEEE 802.11 communication, such as 2.4 GHz, 3.6 GHz, and 5 GHz bands. Other frequency bands can be used without deviating from the scope of the present disclosure.

Example aspects of the present disclosure are directed to configuring one or more of the multimode antennas 112 and 114 to increase signal quality on a per frame, per group, per antenna basis. More particularly, for each frame, one or more of the multimode antennas 112 and 114 can be operated in a selected mode to improve communication with one or more of the groups 126*a*, 126*b*, 126*c*, and 126*d*. During the next frame when communicating with a different group, one or more of the multimode antennas 112 and 114 can be configured in a different mode to enhance signal quality with the different group.

Figure 2:
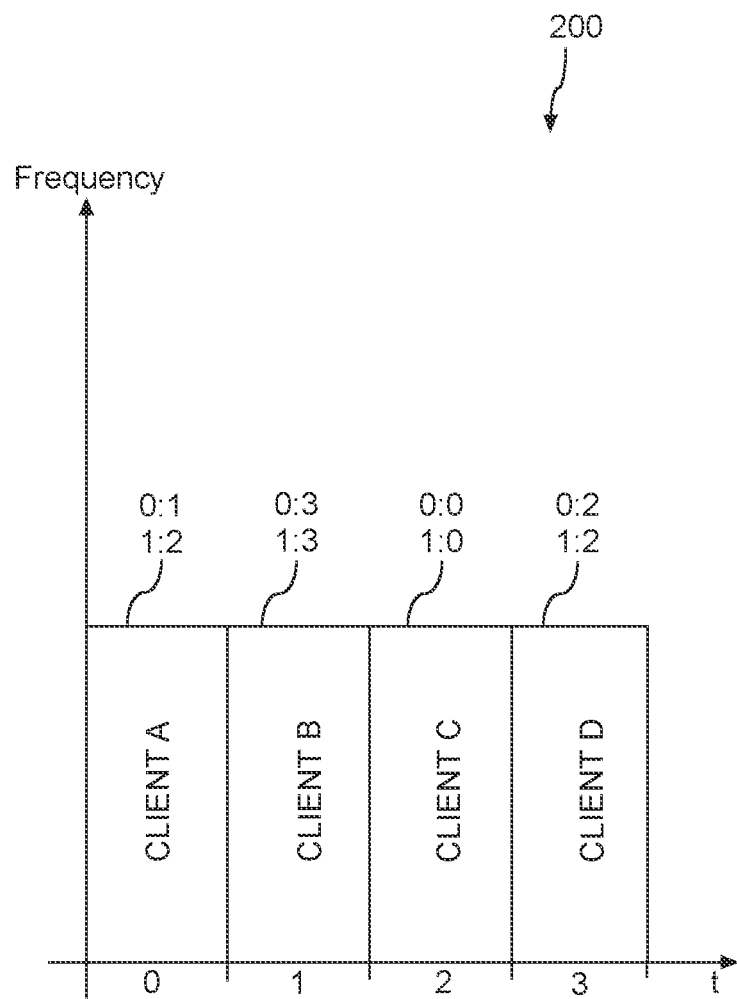
FIG. 2 depicts a graphical representation of example communication from an access point to multiple groups of client devices according to example embodiments of the present disclosure.

FIG. 2 depicts a graphical representation 200 of example communication from an access point to multiple groups of client devices according to example embodiments of the present disclosure. FIG. 2 plots time along the horizontal axis and frequency band along the vertical axis. As shown, the base station communicates with four different groups of client devices (e.g., group A, group B, group C, and group D) in a time division multiplexed manner. More particularly, time can be subdivided into a plurality of frames. During each frame, the base station can communicate with (e.g., transmit or receive) one of the plurality of groups (e.g., including one or more client devices) over the same frequency band. For example, as shown in FIG. 2, the base station communicates with group A during frame 0. The base station communicates with group B during frame 1. The base station communicates with group C during frame 2. The base station communicates with group D during frame 3.

Two modal antennas can be configured in different modes in different frames depending on the group with which the base station is communicating. In a single frame, two or more modal antennas can utilize the same mode to communicate with a plurality of client devices in a group. The modes of the antennas are designated using the nomenclature x:y with x representing the antenna and y representing the mode of the antenna.

More particularly, during frame 0 while communicating with group A, modal antenna 0 is configured in mode 1 and modal antenna 1 is configured in mode 1. During frame 1 while communicating with group B, modal antenna 0 is configured in mode 3 and modal antenna 1 is configured in mode 3. During frame 2 while communicating with group C, modal antenna 0 is configured in mode 0 and modal antenna 1 is configured in mode 0. During frame 3 while communicating with group D, modal antenna 0 can be configured in mode 2 and modal antenna 1 can be configured in mode 2. In this way, the communication system can use a plurality of modal antennas each using the same mode to communicate with a plurality of client devices in a group during a single frame.

FIG. 2 depicts communication using a time division multiplexing scheme for purposes of illustration and discussion. Example aspects of the present disclosure can be used with other multiplexing scheme or communication schemes without deviating from the scope of the present disclosure.

Figure 3:
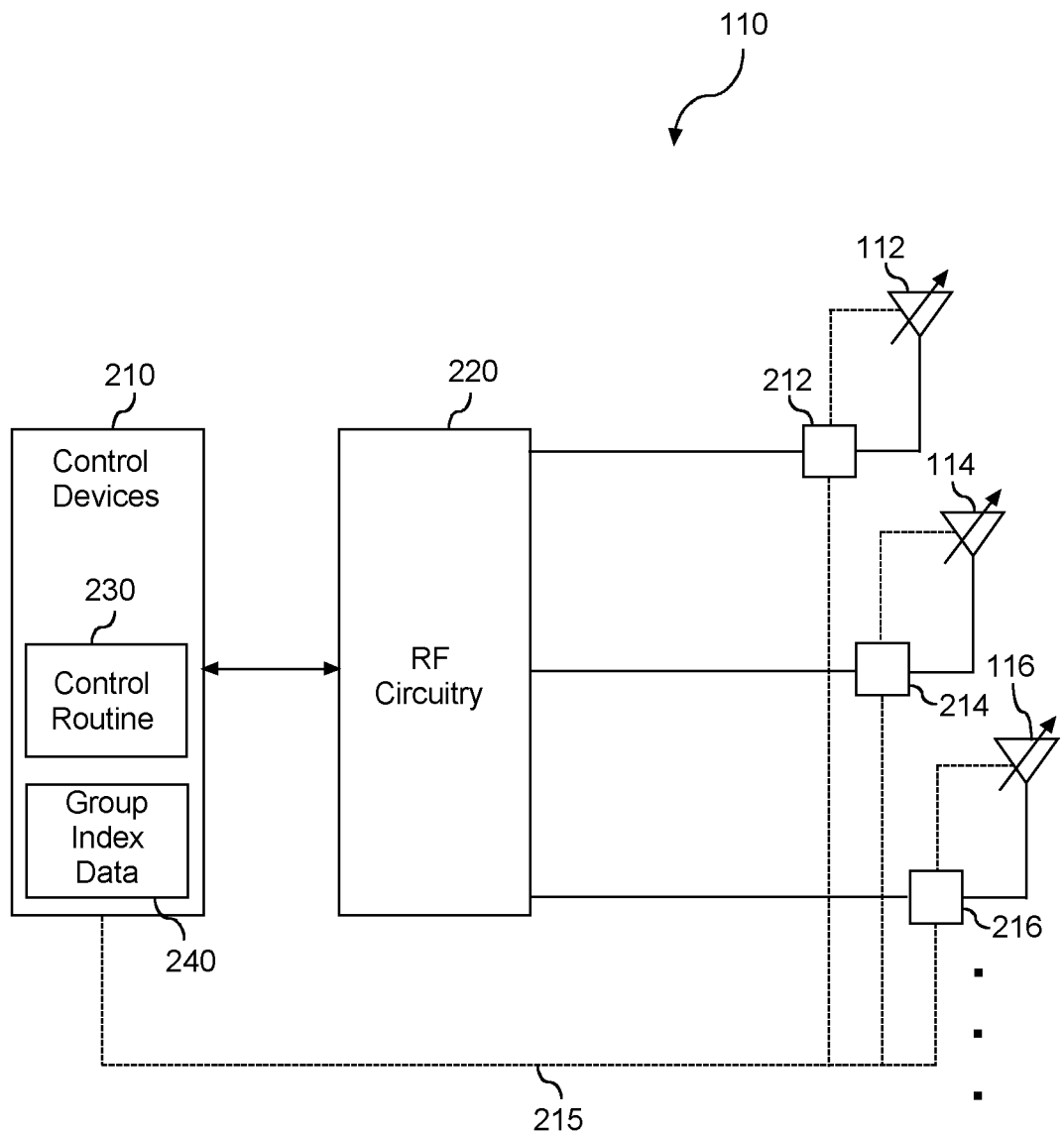
FIG. 3 depicts a schematic of an example access point according to example embodiments of the present disclosure.

FIG. 3 depicts a schematic of an example base station 110 according to example embodiments of the present disclosure. The base station 110 includes RF circuitry 220 (e.g., transceiver, front end module, etc.) The RF circuitry 220 can be configured to communicate RF signals over transmission lines to modal antennas 112, 114, 116, etc. More or fewer modal antennas can be used in the base station 110 without deviating from the scope of the present disclosure.

The RF circuitry 220 can encode information in RF signals for communication via one or more antennas 112, 114, and 116. The RF circuitry 220 can include one or more multiplexing circuits configured to control the communication of frames in, for instance, a time division multiplexed manner. The RF circuitry 220 can include other components for conditioning the RF signals communicated by antennas 112, 114, and 116, such as one or more transceivers, impedance matching circuits, low noise amplifiers, power amplifiers, etc.

As shown, the base station 110 includes one or more control devices 210. The control device(s) 210 can be any device capable of controlling operation of components of the base station 110. For instance, the control device(s) can include one or more processors (e.g., a host processor, baseband processor, etc.). In some embodiments, the control device(s) can execute computer-readable instructions stored in memory to cause the control device(s) to perform operations, such as any of the operations disclosed herein.

The control device(s) 210 can control the modal antennas by sending control signals via one or more control lines 215 to antenna configuring modules 212, 214, and 216. Antenna configuration modules 212 can include, for instance, RF switch(s), MEMs switch(s), tunable capacitor(s), tunable inductor(s), PIN diode(s), combinations of the forgoing, or other suitable components. Antenna configuring module 212 can include and/or can control the modal antenna 112 to configure the antenna 112 in one of a plurality of different modes based on control signal(s) received from control device(s) 210 over control line(s) 215. Antenna configuration module 214 can include and/or can control modal antenna 114 to configure the antenna 114 in one of a plurality of different modes based on control signal(s) received from control device(s) 210 over control line(s) 215. Antenna configuration module 216 can include and/or can control modal antenna 116 to configure the antenna 116 in one of a plurality of different modes based on control signal(s) received from control device(s) 210 over control line(s) 215.

The control device(s) 210 can execute a control routine 230 (e.g., algorithm) that configures the mode of the one or more of the modal antennas 112, 114, 116 on a per frame, per group, per antenna basis to enhance signal quality with communication to group(s) of client devices. For instance, during a first frame when communicating with a first group, the control device(s) 210 can configured to operate one or more of the modal antenna(s) 112, 114, 116 in a first set of modes. During a second frame when communicating with a second group, the control device(s) 210 can configured to operate one or more of the modal antenna(s) 112, 114, 116 in a second set of modes.

The control routine 230 can select a set of modes for operating the one or more antennas 112, 114, 116 to enhance signal quality and/or optimize signal quality of communication with a group of client devices during the frame. In some embodiments, the control routine 230 can select the set of modes based on CQI(s) associated with communicating with each client device of the plurality of client devices during the frame to enhance signal quality. One or more modes, based at least in part on the CQI(s), can be associated with each group of client devices. The CQI(s) can include one or more of can include, for instance, signal-to-noise ratio (SNR), signal to interference-plus-noise ratio (SINR), receive signal strength indicator (RSSI), bit error rate (BER), a magnitude error ratio (MER), an error vector magnitude (EVM), a block error rate (BLER), a packet error rate (PER) combinations of the foregoing, and/or various other metrics.

In some embodiments, the control routine 230 can select a set of modes for operating the one or more antennas 112, 114, 116 to enhance signal quality and/or optimize signal quality of communication with a group of client devices during the frame based on group index data 240. The control routine 230 can sort each client device into groups based on the mode associated with each client device. Group index data can include data that associates a particular mode for modal antennas 112, 114, and 116 to a particular group of client devices. For example, the control routine 230 can sort three client devices into a group 1. The group index data 240 can correlate one or more optimum modes (e.g., one or more modes with the highest or near highest CQI metric) of a modal antenna(s) with group 1. The group index data can be stored and/or implemented in one or more memory devices. The group index data can be implemented as a lookup table, matrix, data structure, function, algorithm or other implementation that correlates one or more particular modes of a modal antenna to a group of client devices.

Figure 4:
FIG. 4 depicts example group index data according to example embodiments of the present disclosure.

A representation of example group index data 240 is shown in FIG. 4. As shown, the example group index data 240 associated modes of antennas 0, 1, 2, and 3 with groups A, B, C, and D. Groups A, B, C, and D can be, for instance, groups 126a, 126b, 126c and 126d of FIG. 1. During a frame, the control device(s) 210 (FIG. 3) can determine (based on signals from RF circuitry) that a particular communication packet is associated with one of groups A, B, C, and D. During the frame, the control device(s) 210 can access the group index data 240 to determine the mode to operate one or more of the modal antenna(s) 0, 1, 2, and 3. The control device(s) 210 can control one or more of the antenna(s) 210 in a determined mode during the frame. The number of antennas controlled by control device(s) 210 can be based on the number of client devices in a group. This process can repeat on a per frame basis.

As an illustration, using the example group index data of FIG. 4, during a first frame of communication with group A, one or more of the antennas 0, 1, 2, and 3 can be configured as follows: antenna 0 in mode 0; antenna 1 in mode 0; antenna 2 in mode 0; antenna 3 in mode 0. During a second frame of communication with group B, one or more of the antennas 0, 1, 2, and 3 can be configured as follows: antenna 0 in mode 3; antenna 1 in mode 3; antenna 2 in mode 3; antenna 3 in mode 3. During a third frame of communication with group C, one or more of the antennas 0, 1, 2, and 3 can be configured as follows: antenna 0 in mode 2; antenna 1 in mode 2; antenna 2 in mode 2; antenna 3 in mode 2. During a fourth frame of communication with group D, one or more of the antennas 0, 1, 2, and 3 can be configured as follows: antenna 0 in mode 1; antenna 1 in mode 1; antenna 2 in mode 1; antenna 3 in mode 1. In this way, the communication system can communicate with a plurality of client devices in a group associated with a certain mode.

The group index data 240 can be based on CQI. For instance, the modes associated with each group can be determined for the group index data 240 based on CQI associated with communicating with each client device of the plurality of client devices. Example methods for training/generating group index data 240 will be discussed in detail below.

Figure 5:
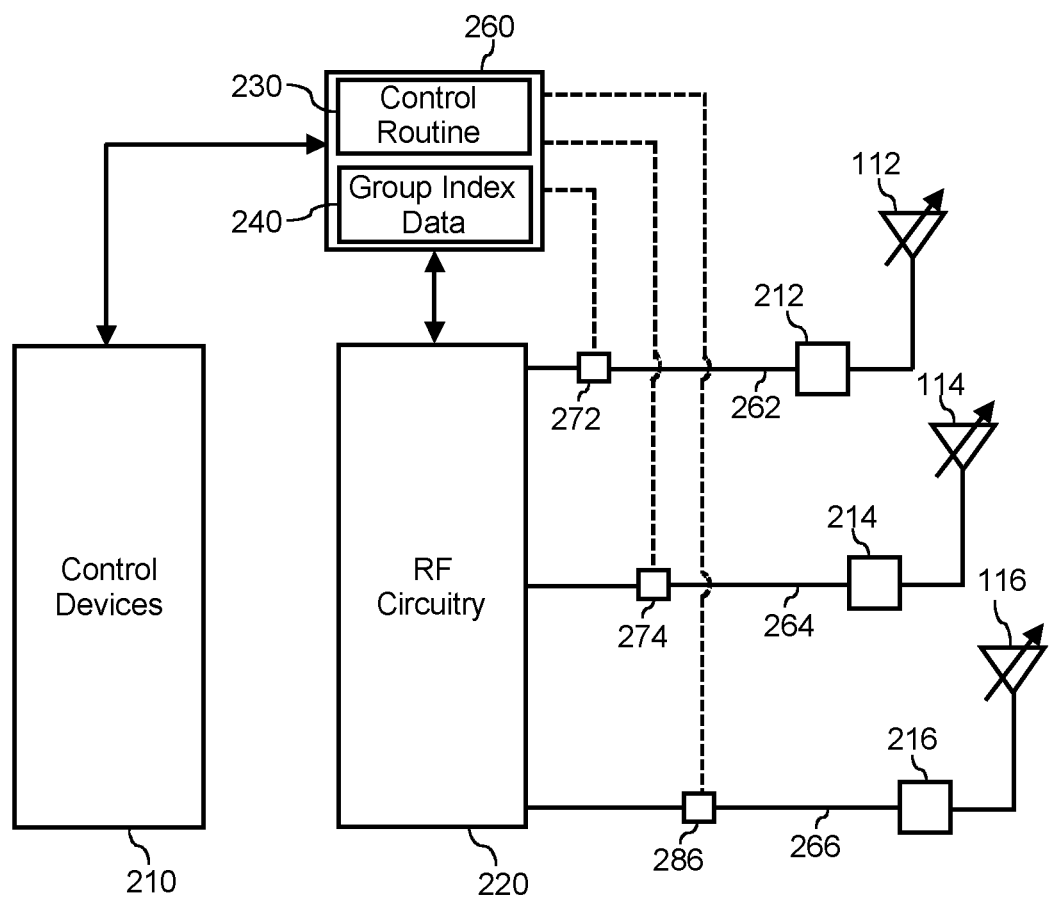
FIG. 5 depicts a schematic of an example access point according to example embodiments of the present disclosure.

FIG. 5 depicts a schematic of another example base station 110 according to example embodiments of the present disclosure. The base station 110 includes RF circuitry 220 (e.g., transceiver, front end module, etc.) The RF circuitry 220 can be configured to communicate RF signals over transmission lines to modal antennas 112, 114, 116, etc. More or fewer modal antennas can be used in the base station 110 without deviating from the scope of the present disclosure.

The RF circuitry 220 can encode information in RF signals for communication via one or more antennas 112, 114, and 116. The RF circuitry 220 can include one or more multiplexing circuits configured to control the communication of frames in, for instance, a time division multiplexed manner. The RF circuitry 220 can include other components for conditioning the RF signals communicated by antennas 112, 114, and 116, such as one or more transceivers, impedance matching circuits, low noise amplifiers, power amplifiers, etc.

As shown, the base station 110 includes one or more control device(s) 210 and 260. In this example, the control device(s) 210 can be any device capable of controlling operation of components of the base station 110. For instance, the control device(s) can include one or more processors (e.g., a host processor, baseband processor, etc.). The control device(s) 260 can include an antenna controller. The antenna controller can control operation of the modal antenna(s) 112, 114, and 116 based on signals/information from the control device(s) 210 (e.g., host processor) and/or the RF circuitry 220.

In some embodiments, the control device(s) 210 and 260 can execute computer-readable instructions stored in memory to cause the control device(s) 210 and 260 to perform operations, such as any of the operations disclosed herein.

In the example of FIG. 5, the control device(s) 260 can control the modal antennas 112, 114, and 116 by modulating control signals onto transmission lines for providing RF signals to antennas 112, 114, and 116. For example, control device(s) 260 can modulate a control signal onto a transmission line 262 (e.g., coaxial transmission line) using various modulation techniques (e.g., amplitude shift keying, etc.) to control antenna configuration module 212 via a bias tee circuit 272. Control device(s) 260 can modulate a control signal onto a transmission line 264 (e.g., coaxial transmission line) using various modulation techniques (e.g., amplitude shift keying, etc.) to control antenna configuration module 214 via a bias tee circuit 274. Control device(s) 260 can modulate a control signal onto a transmission line 266 (e.g., coaxial transmission line) using various modulation techniques (e.g., amplitude shift keying, etc.) to control antenna configuration module 216 via a bias tee circuit 276.

Antenna configuration module 212 can include and/or can control one or more active elements associated with modal antenna 112 to configure the antenna 112 in one of a plurality of different modes based on control signal(s) received over transmission line 262. Antenna configuration module 214 can include and/or can control one or more active elements associated with modal antenna 114 to configure the antenna 114 in one of a plurality of different modes based on control signal(s) received over transmission line 264. Antenna configuration module 216 can include and/or can control one or more active elements associated with modal antenna 116 to configure the antenna 116 in one of a plurality of different modes based on control signal(s) received over transmission line 266.

The control device(s) 260 can execute a control routine 230 (e.g., algorithm) that configures the mode of the one or more of the modal antennas 112, 114, 116 on a per frame, per group, per antenna basis to enhance signal quality with communication to client device(s). For instance, during a first frame when communicating with a first group, the control device(s) 210 can configured to operate one or more of the modal antenna(s) 112, 114, 116 in a first set of modes. During a second frame when communicating with a second group, the control device(s) 210 can configured to operate one or more of the modal antenna(s) 112, 114, 116 in a second set of modes.

The control routine 230 can select a set of modes for operating the one or more antennas 112, 114, 116 to enhance signal quality and/or optimize signal quality of communication with a group of client devices during the frame. In some embodiments, the control routine 230 can select the set of modes based on CQI(s) associated with communicating with the group of client devices during the frame to enhance signal quality. The CQI(s) can include one or more of can include, for instance, signal-to-noise ratio (SNR), signal to interference-plus-noise ratio (SINR), receive signal strength indicator (RSSI), bit error rate (BER), a magnitude error ratio (MER), an error vector magnitude (EVM), a block error rate (BLER), a packet error rate (PER) combinations of the foregoing, and/or various other metrics.

In some embodiments, the control routine 230 can select a set of modes can select a set of modes for operating the one or more antennas 112, 114, 116 to enhance signal quality and/or optimize signal quality of communication with a group of client devices during the frame based on group index data 240. Group index data 240 can include data that associates one or more modes for modal antennas 112, 114, and 116 to a particular group. For instance, the group index data 240 can correlate one or more optimum modes (e.g., modes with the highest and/or near highest CQI metric) of a modal antenna(s) with a group of client devices. The group index data can be stored and/or implemented in one or more memory devices. The group index data can be implemented as a lookup table, matrix, data structure, function, algorithm or other implementation that correlates one or more modes of a modal antenna to a group.

Example group index data 240 is illustrated in FIG. 4. The group index data 240 can be based on CQI. For instance, the modes associated with each group can be determined for the group index data 240 based on CQI(s) associated with communicating with each client device of the plurality of client devices. Example methods for training/generating group index data 240 will be discussed in detail below.

Figure 6:
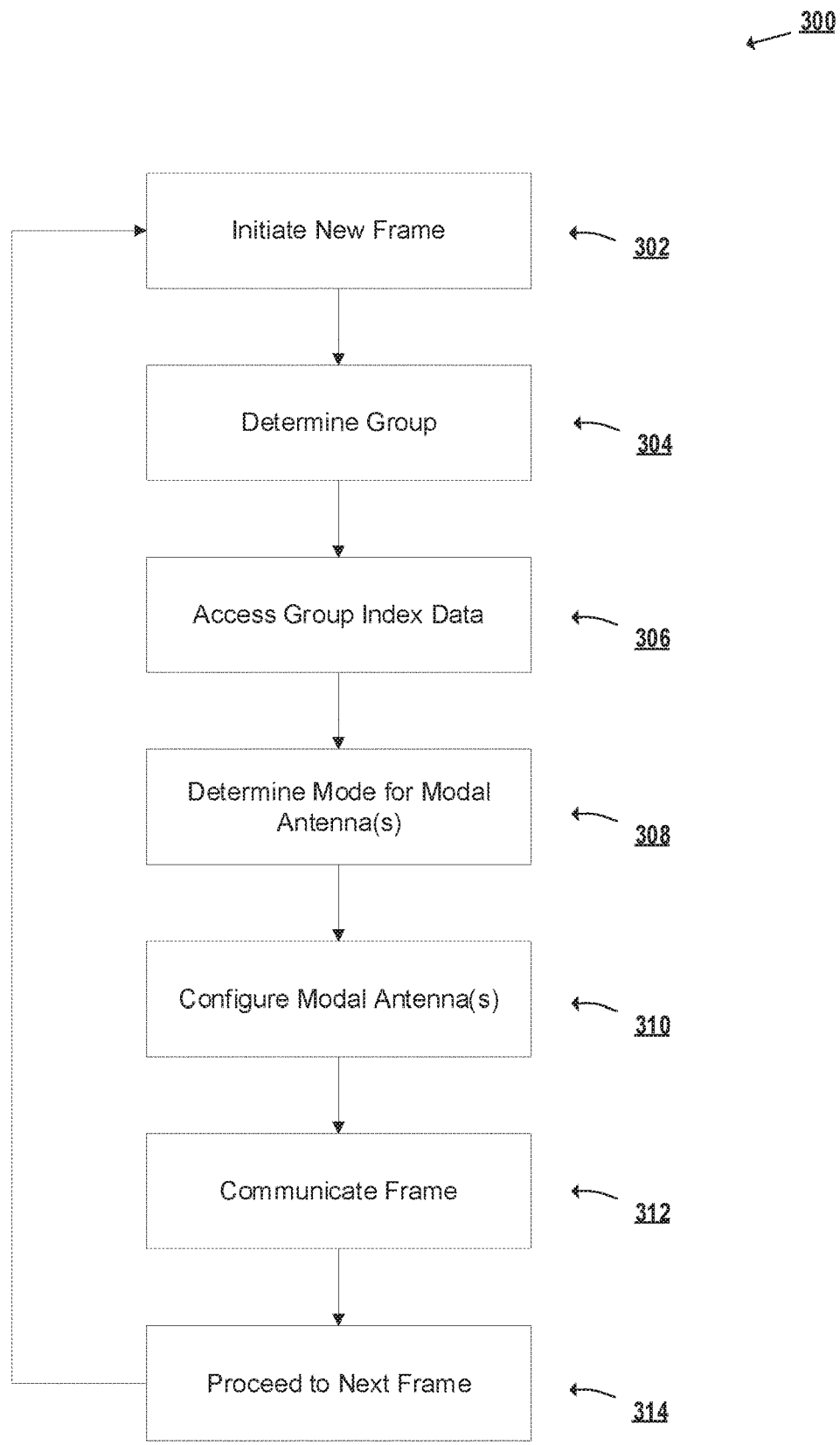
FIG. 6 depicts a flow diagram of an example method for frame to frame communication according to example embodiments of the present disclosure.

FIG. 6 depicts a flow diagram of an example method (300) for frame to frame communication according to example embodiments of the present disclosure. The method (300) can be implemented, for instance, using any of the communication systems or components of the communication systems (e.g., base stations) discussed herein. The method (300) illustrates steps performed in a particular order for purposes of illustration and discussion. Those of ordinary skill in the art, using the disclosures provided herein, will understand that various steps of any of the methods discussed herein can be adapted, modified, performed simultaneously, rearranged, include steps not illustrated, and/or expanded in various ways without deviating from the scope of the present disclosure.

At (302), the method includes initiating a new frame. For instance, a first frame can be used to transmit to group A. A second frame can be used to receive from group A. A third frame can be used to transmit to group B. A fourth frame can be used to receive from group B, and so forth. A frame can have any suitable length. Frames change when adjusting from transmit to receive. Frames change when communicating with different client devices. According to aspects of the present disclosure and as illustrated in FIG. 6, the method (300) can be implemented on a per frame basis (e.g., every frame).

At (304), the method includes determining the group of client devices with which the base station is communicating during the frame. This can be determined, for instance, by one or more control data based on signals from RF circuitry, such as a transceiver.

At (306), the method includes accessing group index data, for instance, from memory. As described above, group index data can include data that associates one or more modes for one or more modal antenna(s) to a group. For instance, the group index data can correlate one or more optimum modes (e.g., modes with the highest and/or near highest CQI metric) of a modal antenna(s) with a group. The group index data can be stored and/or implemented in one or more memory devices. The group index data can be implemented as a lookup table, matrix, data structure, function, algorithm or other implementation that correlates one or more particular modes of a modal antenna to a group. Example group index data is illustrated in FIG. 4.

At (308) of FIG. 6, the method includes determining a mode for operating one or more modal antennas based at least in part on the group index data and the group identified at (304). For instance, the mode can be determined as the mode associated with the group identified at (304) in the group index data.

At (310), the method includes configuring the modal antenna(s) in the determined mode. For instance, control signals can be provided to an antenna configuration module. The antenna configuration module can include and/or can control one or more active elements to adjust a mode of the modal antenna(s) to be the mode determined at (308).

At (312), the method includes communicating data in the frame while the modal antenna is configured in the mode. The method then proceeds to the next frame (314) where the method (300) repeats itself. In this way, the method (300) can adjust modes of modal antenna(s) on a per frame, per group, per antenna basis in a point to multipoint communication system.

Figure 7:
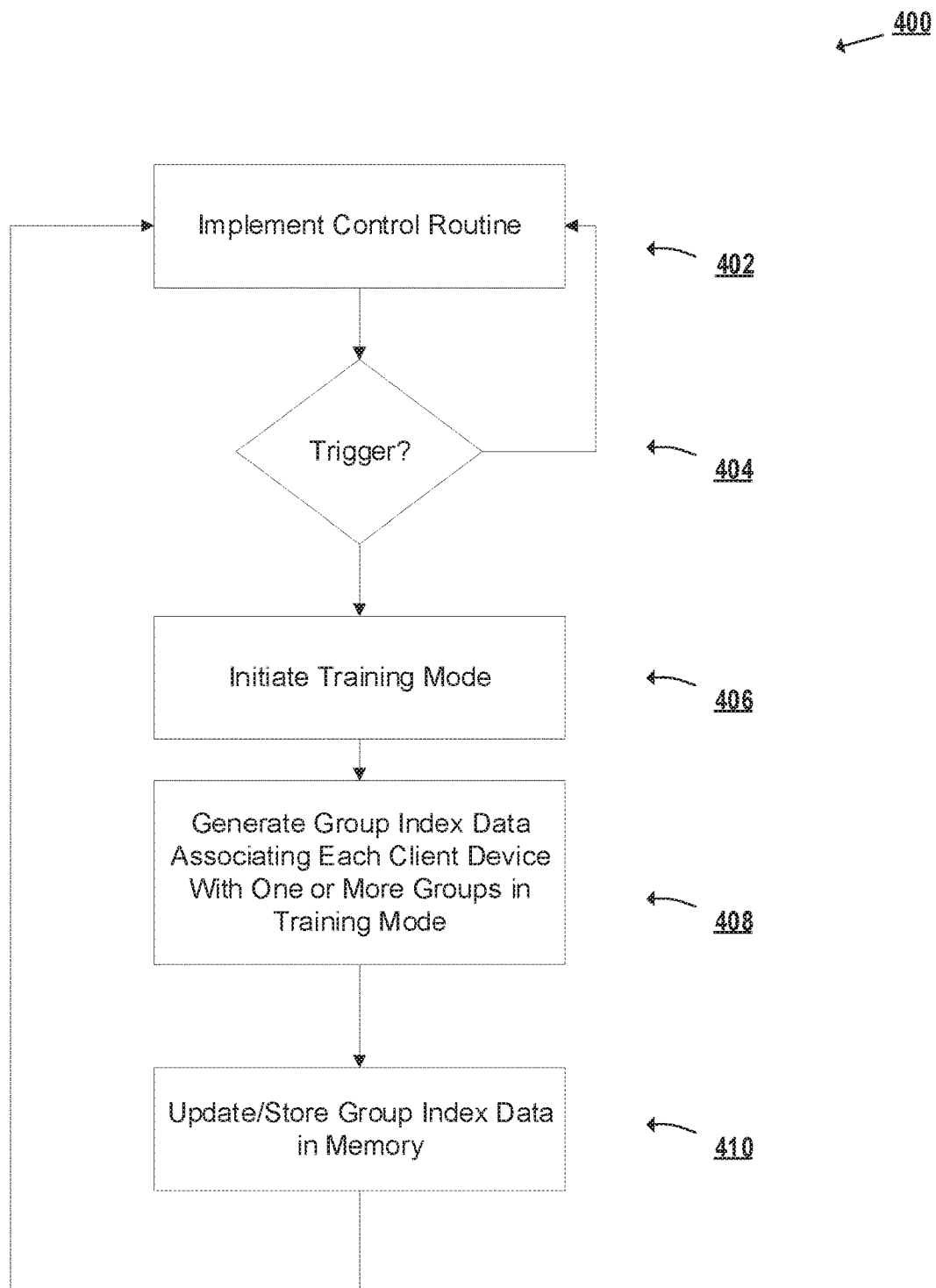
FIG. 7 depicts a flow diagram of an example method for generating group index data according to example embodiments of the present disclosure.

FIG. 7 depicts an example method (400) of generating group index data according to example embodiments of the present disclosure. The method (400) can be implemented, for instance, using any of the communication systems or components of the communication systems (e.g., base stations) discussed herein. The method (400) illustrates steps performed in a particular order for purposes of illustration and discussion. Those of ordinary skill in the art, using the disclosures provided herein, will understand that various steps of any of the methods discussed herein can be adapted, modified, performed simultaneously, rearranged, include steps not illustrated, and/or expanded in various ways without deviating from the scope of the present disclosure.

At (402), the method can include implementing a control routine. The control routine can be, for instance, the method (300) of FIG. 6 for configuring modal antennas on per frame, per group, per antenna basis in a point to multipoint communication system.

At (404), the method can include determining a trigger condition. If present, the trigger condition can lead to initiating a training mode (404). When no trigger condition is present, the method (400) continues to implement the control routine (402) in normal fashion.

The trigger condition can be defined in any suitable manner. As one example, the trigger condition can be associated with startup or set up of the communication system. As another example, a trigger condition can be the passage of a period of time. In this way, the system can implement the training mode at regular and/or irregular time intervals.

As another example, the trigger condition can be associated with a manual request to enter a training mode. For instance, a user can interact with a user interface to request the system to enter the training mode. The user interface can be, for instance, a button or other interface located on the base station. The user interface can be a graphical user interface presented on a display device associated with the base station. In some instances, the user interface can be associated with a remote device in communication with the base station over a network. For instance, the user interface can be associated with a user device (e.g., smartphone, tablet, etc.) in communication with the base station over a wireless network.

At (406), the method (400) can include initiating a training mode based on a CQI change or based on a use condition. For instance, the system can implement the training mode when a CQI associated with communicating to a group of client devices changes by a threshold amount. As another example, the system can implement the training mode when a location associated with a group of client devices has moved by a threshold amount (e.g., as determined from, for instance, signal strength, data from a positioning system, etc.). In some embodiments, the training mode can be implemented when a new client device joins/leaves a group and/or a group joins/leaves the communication system.

At (408), the method (400) can include generating group index data in the training mode. More particularly, when operating in a training mode, CQI(s) associated with communicating with each client device of a plurality of client devices can be obtained. These CQI(s) can be analyzed to associate antenna mode(s) with each client device of the plurality of client devices for providing increased signal quality (e.g., increased CQI) in communications. For example, CQI(s) associated with a client device A can be analyzed to associate a mode 3 of a modal antenna with a client device A. For another example, CQI(s) associated with a client device B can be analyzed to associate modes 2 and 4 of a modal antenna with the client device B.

In some embodiments, each client device of the plurality of client devices can be sorted into one or more groups based at least in part on the client devices associations with one or more modes. Each group membership of a client device can be stored in group index data. For example, client devices A and B, each respectively associated with modes 1 and 2 of a modal antenna, may be sorted into a group 1, the group 1 being associated with modes 1 and 2 of the modal antenna. For another example, client device C, being associated with mode 4 of a modal antenna, may be sorted into groups 2 and 3, both groups being associated with mode 4 of the modal antenna. Each of these group memberships can be stored in group index data.

At (410), the method (400) can include updating and/or storing the group index data in memory. The group index data can be implemented as a lookup table, matrix, data structure, function, algorithm or other implementation that correlates one or more particular modes of a modal antenna to a group of client devices.

Several different techniques can be implemented for the training mode. For example, the training mode can be implemented as an interframe training mode. An example interframe training mode will be discussed with reference to FIG. 8. As another example, the training mode can be implemented as an intraframe training mode. An example intraframe training mode will be discussed with reference to FIG. 9.

Figure 8:
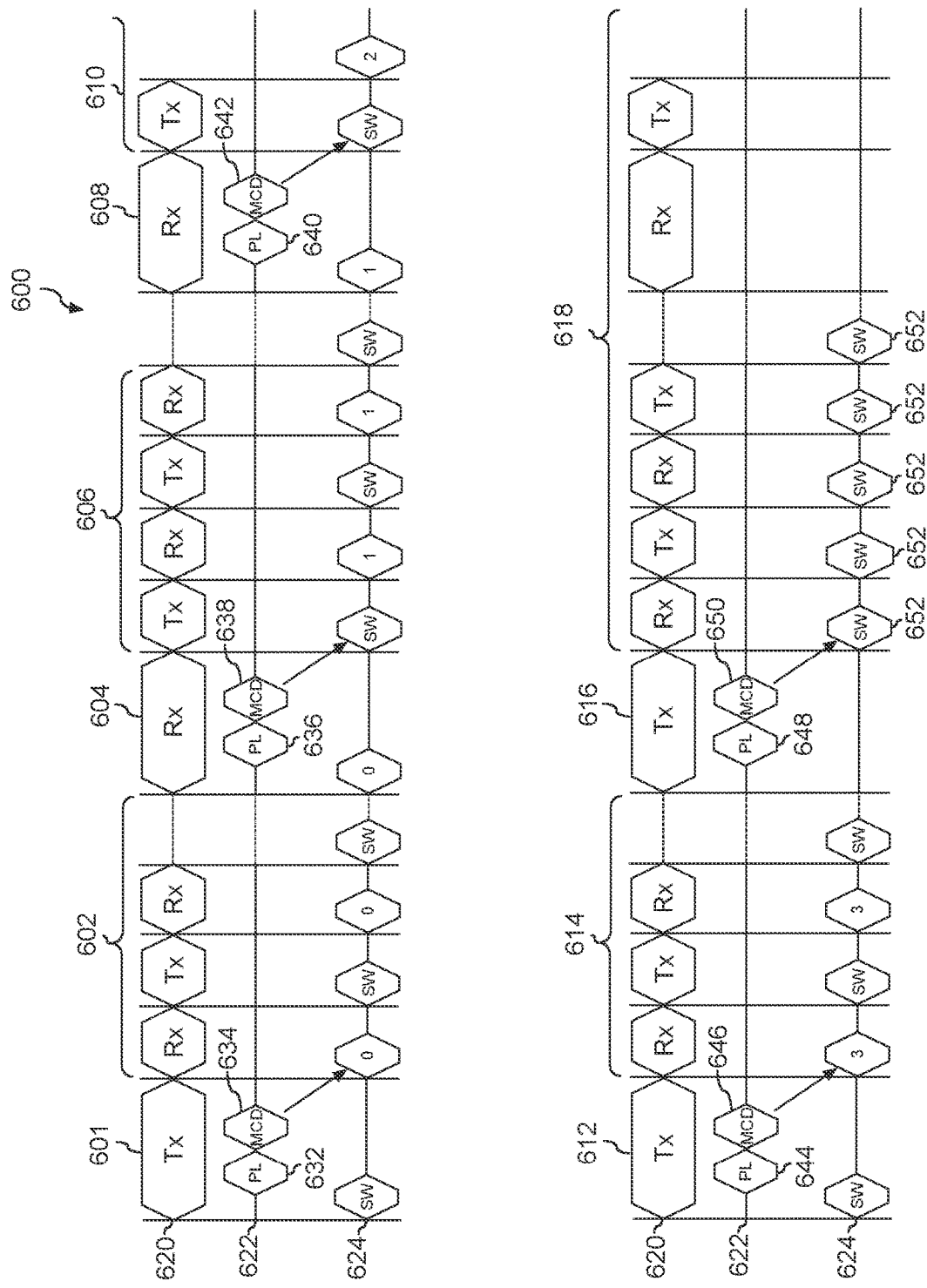
FIG. 8 depicts example interframe training for a communication system according to example embodiments of the present disclosure.
Figure 9:
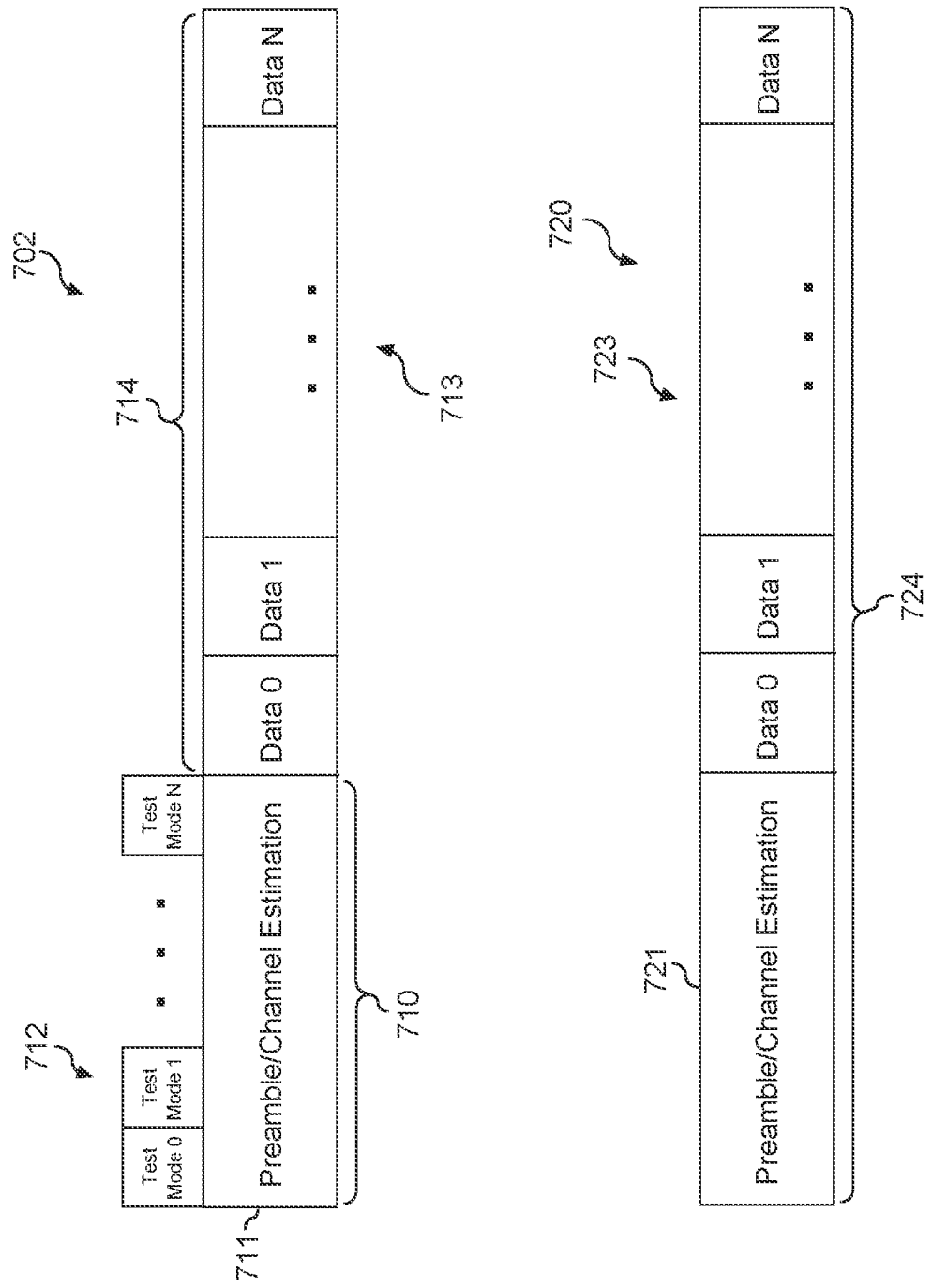
FIG. 9 depicts example intraframe training according to example embodiments of the present disclosure.

FIG. 8 depicts a sequence of frames 600 associated with an interframe training mode according to example embodiments of the present disclosure. The interframe training mode in FIG. 9 is implemented only in receive frames for a client. Line 620 for a frame represents whether the frame is a transmit frame or a receive frame. Line 622 for a frame represents control actions for one or more control device(s) (e.g., host processor, antenna controller, etc.) occurring during the frame. Line 624 for a frame represents the controlled antenna mode of operation for a modal antenna during the frame. "SW" in line 624 refers to current best mode of the plurality of modes for operating the antenna (e.g., as determined from previous group index data). "PL" in line 622 refers to a payload having CQI(s) associated with communicating in a particular mode. "MCD" refers to a decision made by the control devices to update the best mode based on the CQI(s).

Referring to FIG. 8, at frame 601 the antenna is configured in the previous best mode at 630 (e.g., as determined from group index data). CQIs associated with operating in the best mode are obtained at 632. A decision to enter into training mode is initiated at 634. Over a next set of frames 602, the modal antenna is controlled to be in mode 0 in receive frames only. The modal antenna is controlled to be in the best mode during transmit frames. At frame 604, CQIs associated with mode 0 are obtained at 636. A decision is made at 638 to update the group index data with mode 0 as the best mode if CQIs associated with mode 0 are better than the previous best mode.

Over a next set of frames 606, the modal antenna is controlled to be in mode 1 in receive frames only. The modal antenna is controlled to be in the best mode during transmit frames. At frame 608, CQIs associated with mode 1 are obtained at 640. A decision is made at 642 to update the group index data with mode 1 as the best mode if CQIs associated with mode 1 are better than the previous best mode.

Over a next set of frames 610, the modal antenna is controlled to be in mode 2 in receive frames only. The modal antenna is controlled to be in the best mode during transmit frames. At frame 612, CQIs associated with mode 2 are obtained at 644. A decision is made at 646 to update the group index data with mode 2 as the best mode if CQIs associated with mode 2 are better than the previous best mode.

Over a next set of frames 614, the modal antenna is controlled to be in mode 3 in receive frames only. The modal antenna is controlled to be in the best mode during transmit frames. At frame 616, CQIs associated with mode 3 are obtained at 648. A decision is made at 650 to update the group index data with mode 3 as the best mode if CQIs associated with mode 3 are better than the previous best mode. The antenna can be operated in the best mode 652 during future frames 618 with the group of clients. The interframe training process shown in FIG. 8 can be repeated for each different client of the plurality of clients in the communication system.

FIG. 9 depicts frames associated with an intraframe training mode according to example aspects of the present disclosure. More particularly, a first frame 702 (e.g., a receive frame) can include a preamble/channel estimation portion 711 and a data portion 713. The preamble/channel estimation portion 711 can include symbols/bits associated with a preamble of a packet and/or for channel estimation functions. The data portion 713 can include bits/symbols associated with a payload or data communicated during the frame 702.

During an intraframe training mode, antennas are configured in different modes during the frame and CQI(s) are used to generate group index data. More particularly, during the preamble/channel estimation portion 711 at 712, the antenna can be configured in a plurality of different modes and a best mode can be selected based on CQI(s) for each of the plurality of different modes. During the data portion 713 at 714, the antenna can be configured in the best mode as determined during the preamble/channel estimation portion 711.

Figure 10:
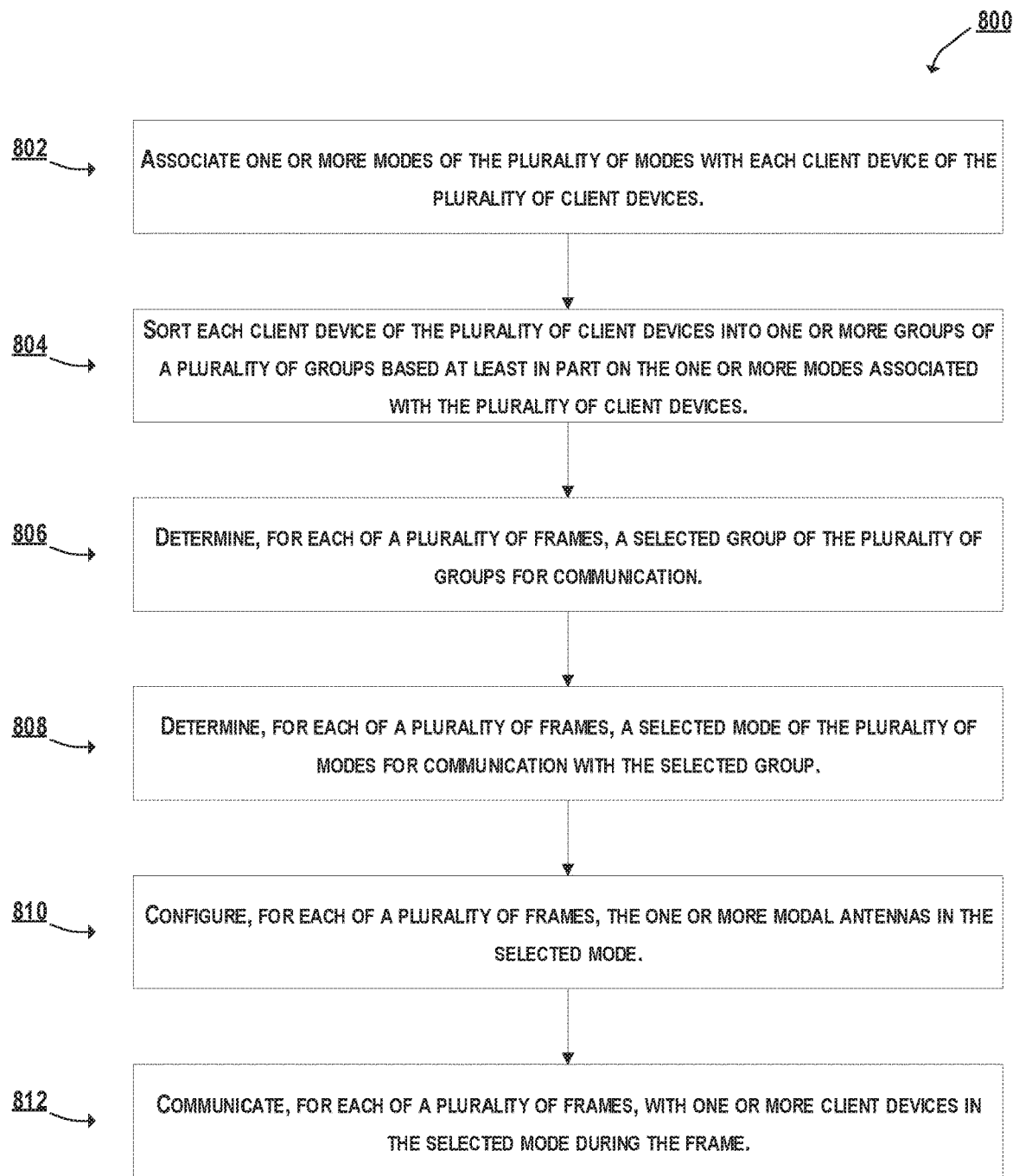
FIG. 10 depicts a method for performing operations for client grouping for point to point communications according to example embodiments of the present disclosure.

FIG. 10 depicts a method (800) for performing operations for client grouping for point to point communications according to example embodiments of the present disclosure. The method (800) can be implemented, for instance, using any of the communication systems or components of the communication systems (e.g., base stations) discussed herein. The method (800) illustrates steps performed in a particular order for purposes of illustration and discussion. Those of ordinary skill in the art, using the disclosures provided herein, will understand that various steps of any of the methods discussed herein can be adapted, modified, performed simultaneously, rearranged, include steps not illustrated, and/or expanded in various ways without deviating from the scope of the present disclosure.

At (802), the operations can include associating one or more modes of the plurality of modes with each client device of the plurality of client devices. A client device can be associated with one or more modes based at least in part on channel quality indicator(s) (CQI(s)). CQIs can be used to characterize uplink signal quality between the base station and each client device of the plurality of client devices and/or to characterize downlink signal quality between the base station and the client devices. For example, a client device A may be associated with mode 1 of a modal antenna if mode 1 provides improved CQI for client device A. For another example, a client device B may be associated with modes 1, 2, and 3 of a modal antenna.

At (804), the operations can include sorting each client device of the plurality of client devices into one or more groups of a plurality of groups based at least in part on the one or more modes associated with the plurality of client devices. Sorting each client device into the one or more groups can be based at least in part on the one or more modes associated with each client device. For example, client devices A, B, and C, each respectively associated with modes 1 and 2 of a modal antenna, may be sorted into a group 1. Client device D, associated with mode 3 of a modal antenna, may be sorted into a group 2.

In some embodiments, sorting each client device into the one or more groups can be based at least in part on group index data. Group index data can store previous associations between a client device and one or more modes. Group index data can further store the previous group membership of a client device. Group index data can yet further store previous associations between groups and one or more best modes. For example, group index data may store a previous association between a client device A and modes 1 and 2 of a modal antenna. For another example, group index data may store data indicating that client device A was previously a member of groups 1 and 2. For yet another example, group index data may store a previous association between group 1 and modes 1 and 2 of a modal antenna.

At (806), the operations can include determining, for each of a plurality of frames, a selected group of the plurality of groups for communication. Determining a selected group can be based at least in part on the plurality of groups of client devices.

At (808), the operations can include determining, for each of a plurality of frames, a selected mode of the plurality of modes for communication with the selected group. The selected mode of the modal antenna(s) for each of a plurality of frames can be determined using group index data. Group index data can include data that associates each client device of the plurality of client devices with one or more groups based at least in part on channel quality indicators (CQI's) indicating the one or more best modes for communicating with each client device. The group index data can further associate one or more modes with each group based on the one or more best modes associated with each member of each group. For instance, the group index data can correlate one or more best modes (e.g., modes with the highest and/or next highest CQI metric) of a modal antenna(s) with a particular group of client devices.

At (810), the operations can include configuring, for each of a plurality of frames, the one or more modal antennas in the selected mode. Configuring the one or more antennas can include selectively coupling the parasitic elements to ground or otherwise adjust electrical characteristics associated with the parasitic elements to adjust the radiation pattern provided by the active radiating element to operate the modal antenna in the selected mode of the plurality of different modes.

At (812), the operations can include communicating, for each of a plurality of frames, with one or more client devices in the selected mode during the frame. Communicating for each of a plurality of frames with one or more client devices can include transmitting and receiving, for each of the plurality of frames, with a group of client devices in a selected mode. For example, the operations can include transmitting and receiving data with a group 1 using a mode 2 of one or more modal antennas, the mode 2 associated with group 1. The group 1 can include client devices A, B, and C, each client device respectively associated with mode 1 of the one or more modal antennas. Furthermore, the data communicated can include data indicative of group membership in the one or more groups to each client device of the plurality of client devices. For example, a client device A may receive data indicating that the client device A belongs to groups 1 and 2, both groups associated respectively with modes 2 and 3 of a modal antenna.

Figure 11:
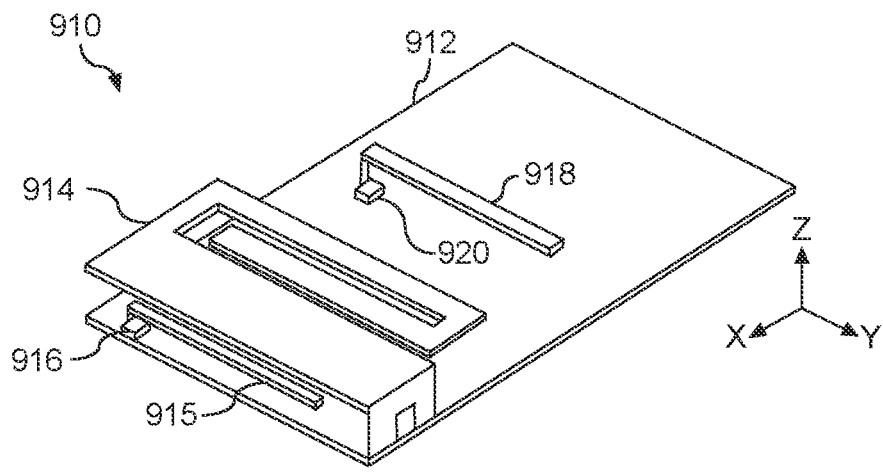
FIG. 11 depicts a multi-mode antenna according to example embodiments of the present disclosure.

FIG. 11 illustrates an example embodiment of a modal antenna 910 that can be used in accordance with aspects of the present disclosure. The modal antenna 910 may include a circuit board 912 (e.g., including a ground plane) and a driven antenna element 914 disposed on the circuit board 912. An antenna volume may be defined between the circuit board (e.g., and the ground plane) and the driven antenna element.

In some embodiments, a first parasitic element 915 may be positioned at least partially within the antenna volume. A first active element 916 may be coupled with the parasitic element 915. The first active element 916 can be a passive or active component or series of components and may be configured to alter a reactance on the first parasitic element 915 either by way of a variable reactance, or shorting to ground, resulting in a frequency shift of the antenna.

In some embodiments, a second parasitic element 918 may be disposed proximate the circuit board 912 and may be positioned outside of the antenna volume. The second parasitic element 918 may further include a second active element 920 which may individually include one or more active and/or passive components. The second active element 920 can be a passive or active component or series of components and may be configured to alter a reactance on the second parasitic element 918 either by way of a variable reactance or shorting to ground, resulting in a frequency shift of the antenna. The second parasitic element 918 may be positioned adjacent the driven element 914 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active element 920 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active element 916 and/or second active element 920 may include at least one of a tunable capacitor, MEMS device, tunable inductor, switch, a tunable phase shifter, a field-effect transistor, or a diode.

Figure 12:
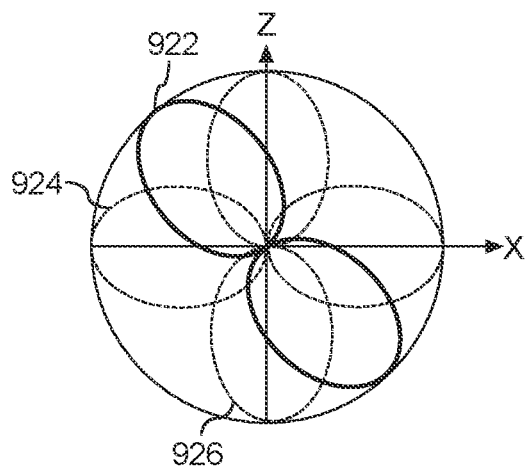
FIG. 12 depicts a two-dimensional radiation pattern associated with a multi-mode antenna according to example embodiments of the present disclosure.

FIG. 12 illustrates a two-dimensional antenna radiation pattern associated with the modal antenna of FIG. 11. The radiation pattern may be shifted by controlling an electrical characteristic associated with at least one of the first and/or second parasitic elements 915, 918 of the modal antenna 910. For example, in some embodiments, the radiation pattern may be shifted from a first mode 922 to a second mode 924, or a third mode 926 and so forth.

Figure 13:
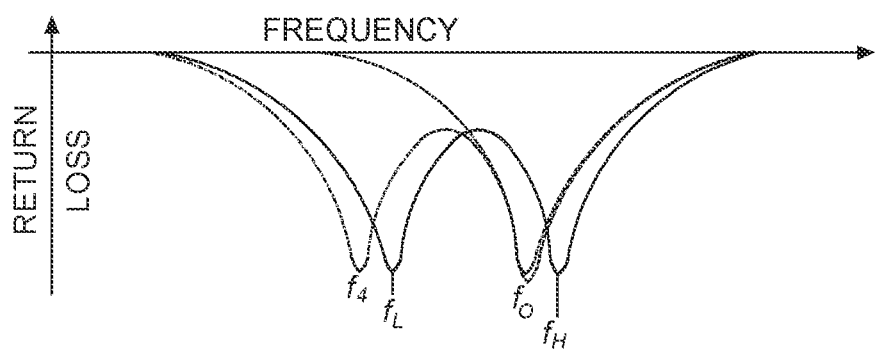
FIG. 13 depicts a frequency plot of a multi-mode antenna according to example embodiments of the present disclosure.

FIG. 13 illustrates an example frequency plot of the modal antenna of FIG. 11 according to example aspects of the present disclosure. The frequency of the antenna can be shifted by controlling an electrical characteristic associated with at least one of the first and/or second parasitic elements 915, 918 of the modal antenna 910. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 11-13 depict one example modal antenna having a plurality of modes for purposes of illustration and discussion. Those of ordinary skill in the art, using the disclosures provided herein, will understand that other modal antennas

What is claimed is:

1. A communication system for point to multipoint communications, comprising:
   one or more modal antennas, each modal antenna configured to operate in a plurality of modes, each of the plurality of modes associated with a distinct radiation pattern;
   a transceiver configured to communicate with a plurality of client devices over a wireless communication medium via the one or more modal antennas over a plurality of frames; and
   one or more control devices configured to perform operations, the operations comprising:
      configuring the one or more modal antennas in each of the plurality of modes for each of the plurality of client devices while the communication system is operating in a training mode;
      obtaining one or more channel quality indicators for each of the plurality of client devices for each of the plurality of modes;
      associating one or more modes of the plurality of modes with each client device of the plurality of client based, at least in part, on the one or more channel quality indicators;
      sorting each client device of the plurality of client devices into one or more groups of a plurality of groups based at least in part on the one or more modes associated with the plurality of client devices;
      generating group index data indicative of the one or more groups into which each of the client devices is sorted;
      storing the group index data in one or more memory devices,
      for each of the plurality of frames:
         determining one of the plurality of groups as a selected group for communication;
         determining one of the plurality of modes as a selected mode for the one or more modal antennas based, at least in part, on the selected group;
         configuring the one or more modal antennas in the selected mode; and
         responsive to configuring the one or more modal antennas in the selected mode, communicating with one or more client devices in the selected group.

2. The communication system of claim 1, wherein at least one group of the plurality of groups comprises a plurality of client devices, each client device associated with a same one or more modes of the plurality of modes.

3. The communication system of claim 1, wherein the plurality of client devices are configured to communicate data indicative of group membership in the one or more groups to each client device of the plurality of client devices.

4. The communication system of claim 1, wherein the group index data further associates each group with one or more modes of the plurality of modes.

5. The communication system of claim 1, wherein storing the group index data in one or more memory devices comprises overwriting previously stored group index data.

6. The communication system of claim 1, wherein the training mode is an interframe training mode.

7. The communication system of claim 1, wherein the training mode is an intraframe training mode.

8. A method for communicating in a point to multipoint communication system, the method comprising:
   associating one or more modes of a plurality of modes of one or more modal antennas with each client device of a plurality of client devices, each modal antenna operable to be configured in a plurality of different modes, each mode associated with a distinct radiation pattern;
   sorting each client device of the plurality of client devices into one or more groups of a plurality of groups based at least in part on the one or more modes associated with the plurality of client devices;
   communicating data over a plurality of frames in a time division multiplexed manner to the plurality of client devices using the one or more modal antennas;
   wherein for each frame, the method comprises:
      determining a selected group of the plurality of groups for communication;
      accessing group index data associating each group of the plurality of groups with one or more modes of the plurality of modes;
      determining one of the plurality of modes as a selected mode for the selected group based on the group index data; and
      configuring the one or more modal antennas to operate in the selected mode during the frame.

9. The method of claim 8, wherein the group index data is generated based at least in part on channel quality indicators obtained while operating the communication system in a training mode.

10. The method of claim 9, wherein the training mode is an interframe training mode.

11. The method of claim 9, wherein the training mode is an intraframe training mode.

12. The method of claim 8, wherein configuring the one or more modal antennas to operate in the selected mode comprises adjusting electrical characteristics of one or more parasitic elements positioned proximate to a radiating element.

13. A wireless network access point, comprising:
   one or more modal antennas operable in a plurality of different modes, each mode associated with a distinct radiation pattern;
   a transceiver configured to communicate with a plurality of groups of client devices over a wireless communication medium via the modal antenna over a plurality of frames;
   one or more control devices configured to control the operation of the one or more modal antennas by selecting a mode of operating the modal antenna on a per frame, per group, per antenna basis by performing operations for each frame, the operations comprising:
      identifying one of the plurality of groups as a selected group for communicating during the frame;

accessing group index data associating each group of the plurality of groups with one or more modes of the plurality of modes;

determining the selected mode for the selected group based at least in part on the group index data;

configuring the one or more modal antennas to operate in the selected mode during the frame.

* * * * *